US010303583B2

United States Patent
Teitel

(10) Patent No.: US 10,303,583 B2
(45) Date of Patent: May 28, 2019

(54) OBJECT DESERIALIZER USING OBJECT-RELATIONAL MAPPING FILE

(71) Applicant: Halliburton Energy Services, Inc., Houston, TX (US)

(72) Inventor: Philip Steven Teitel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/571,100

(22) PCT Filed: Jun. 18, 2015

(86) PCT No.: PCT/US2015/036466
§ 371 (c)(1),
(2) Date: Nov. 1, 2017

(87) PCT Pub. No.: WO2016/204769
PCT Pub. Date: Dec. 22, 2016

(65) Prior Publication Data
US 2018/0173613 A1  Jun. 21, 2018

(51) Int. Cl.
*G06F 11/36* (2006.01)
*G06F 9/455* (2018.01)
(Continued)

(52) U.S. Cl.
CPC ........ *G06F 11/3664* (2013.01); *G06F 9/4493* (2018.02); *G06F 9/455* (2013.01); *G06F 11/36* (2013.01); *G06F 11/3612* (2013.01); *G06F 11/3672* (2013.01); *G06F 11/3676* (2013.01); *G06F 16/116* (2019.01); *G06F 16/1794* (2019.01); *G06F 16/20* (2019.01);
(Continued)

(58) Field of Classification Search
None
See application file for complete search history.

(56) References Cited

U.S. PATENT DOCUMENTS 5,337,234 A   8/1994   Anderson et al.
7,599,948 B2  10/2009  Thompson et al.
(Continued)

FOREIGN PATENT DOCUMENTS

WO   2010/004429 A1   1/2010

OTHER PUBLICATIONS

International Search Report and Written Opinion issued in related PCT Application No. PCT/US2015/063466 dated May 18, 2016, 11 pages.

(Continued)

*Primary Examiner* — Francisco J Aponte
*Assistant Examiner* — Mark A Gooray
(74) *Attorney, Agent, or Firm* — John W. Wustenberg; Baker Botts L.L.P.

(57) ABSTRACT

A method and system for performing a unit test in a self-contained environment. The system may include using an object relationship mapping file to generate data objects that can be used for code for a unit test without having to refer to a database to perform a unit test. The data objects may further provide for simultaneous unit tests and a self-contained environment to perform the unit tests to improve the quality and resources required to perform such unit tests. The system may perform the unit tests independent of access to a database.

20 Claims, 4 Drawing Sheets

(51) Int. Cl.
*G06F 16/20* (2019.01)
*G06F 16/22* (2019.01)
*G06F 16/25* (2019.01)
*G06F 16/11* (2019.01)
*G06F 16/28* (2019.01)
*G06F 16/84* (2019.01)
*G06F 16/21* (2019.01)
*G06F 16/178* (2019.01)
*G06F 9/448* (2018.01)

(52) U.S. Cl.
CPC ............ *G06F 16/21* (2019.01); *G06F 16/258* (2019.01); *G06F 16/288* (2019.01); *G06F 16/84* (2019.01)

(56) References Cited

U.S. PATENT DOCUMENTS

| | | |
|---|---|---|
| 7,610,578 B1 | 10/2009 | Taillefer et al. |
| 8,805,776 B2 | 8/2014 | Parra et al. |
| 2009/0287735 A1* | 11/2009 | Liedes .................... G06F 9/526 |
| 2010/0250625 A1 | 9/2010 | Olenick et al. |
| 2014/0258975 A1 | 9/2014 | Bolotnikoff |
| 2015/0100946 A1* | 4/2015 | Brunswig ........... G06F 11/3664 717/124 |

OTHER PUBLICATIONS

International Preliminary Report on Patentability issued in related PCT Application No. PCT/US/2015/036466, dated Dec. 28, 2017, 8 pages.

* cited by examiner

OBJECT DESERIALIZER USING OBJECT-RELATIONAL MAPPING FILE

CROSS-REFERENCE TO RELATED APPLICATION

The present application is a U.S. National Stage Application of International Application No. PCT/US2015/036466 filed Jun. 18, 2015, which is incorporated herein by reference in its entirety for all purposes.

BACKGROUND

A variety of software applications, including software applications for monitoring and obtaining downhole formation characteristics for subterranean formations, need to modify and update code to implement, improve, or remove features and functions of those applications. To implement these types of changes in code for software applications related to subterranean formations, code must be developed separately and external to the implemented software. To upgrade these systems, this code must also be properly tested to prevent the possibility of introducing errors or unnecessary complexities which may cause issues if implemented in a system.

As an example, upgrading a monitoring tool for obtaining downhole formation characteristics for a subterranean formation may require substantial man hours and other resources. If upgraded software results in an error in that software application, this may result in delay in the development of the drilling operation which could cause substantial monetary or other loss.

In order to ensure the quality of the upgraded portion of the code, software developers perform extensive unit testing on the software update in a self-contained environment. Only after extensive unit testing is the code ready for use in a realtime environment. In a realtime environment, the software application may constantly be connected to a database management system containing a database with substantial amounts of data that needs to be manipulated as a part of that software application. However, in a unit test, such data in the database is not readily available because a self-contained unit test requires that a database remain constant in order to properly evaluate whether the code in the unit test is functioning properly. However, such databases are not readily available because the code in the unit test may act upon the data rendering the data different in the database, the composition of the database may constantly be changing, and tools may not be available to render the data in the database into appropriate useful information for the software to act upon.

Typical software applications handle data in the form of data objects and cannot manipulate data in databases directly. Relational database management systems, in contrast, cannot operate on data objects directly. However, object relational mapping tools do exist to translate data stored in a database into data objects to be manipulated by software applications.

Previously, the quantity of data used and the complexity of the data structures involved in such a unit test make inputting the data into a system to perform the unit test an unrealistic exercise. The functionalities and the relationship associated with the data structures may be too intricate or challenging and unrealistic for a developer to input into a system for testing. Using a database to maintain the data also causes problems because the unit test no longer is in a self-contained environment and the database can be volatile and change with the test, whereas a unit test requires that the database remain constant before each test run.

It is desirable thus to have a tool that can be used to manipulate data into objects that contains the relationship structure for the data without the need to store or extract that data from a database, removing the dependency on the external database. It is further desirable to perform a unit-test that can test a complex data environment without the unrealistic expectation for a developer to create relationships for each data structure from scratch for every unit test, which may be substantial and constant for software applications.

Figure 1:
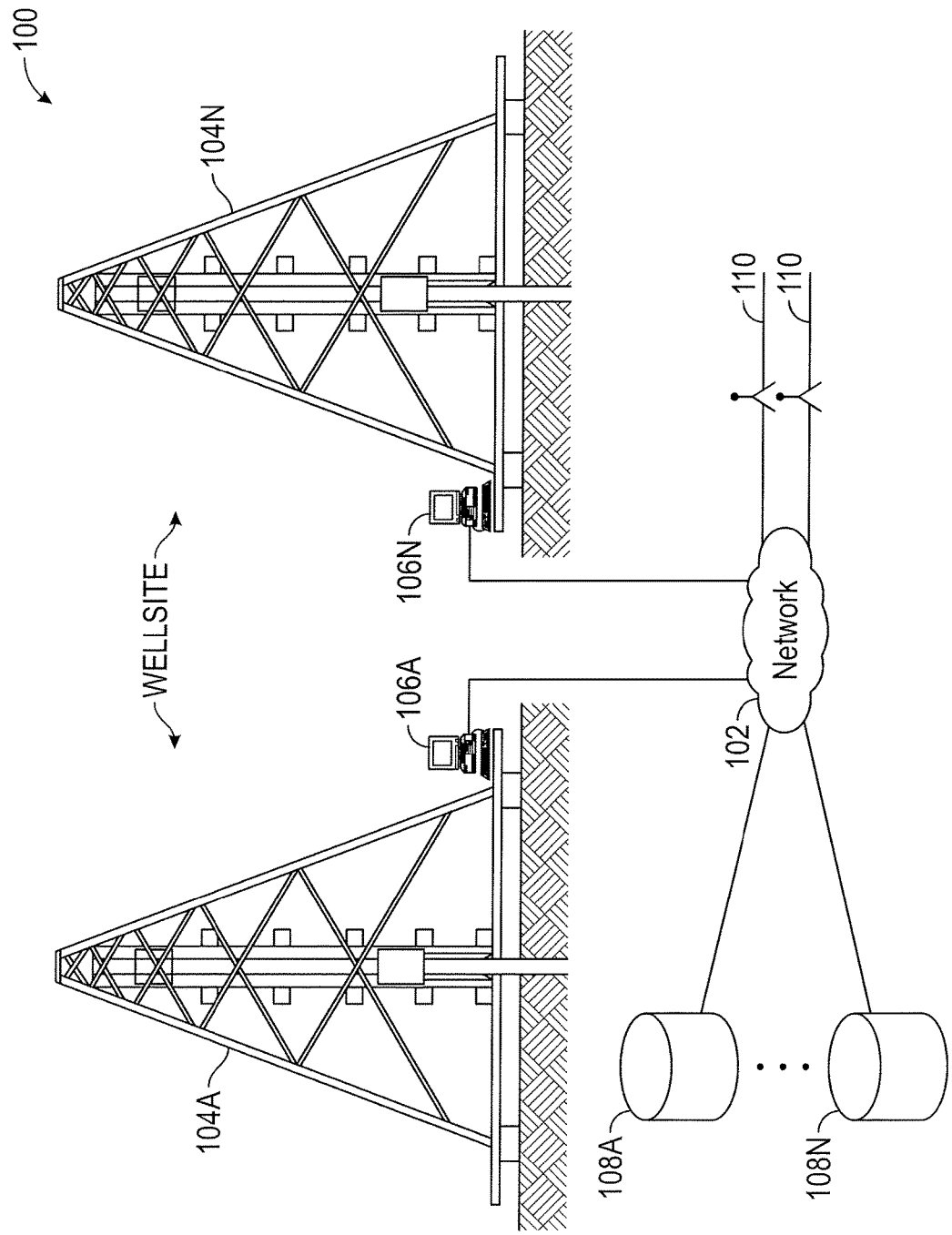
FIG. 1 shows an illustrative system for performing drilling operations.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

It will be understood that the term "oil well drilling equipment" or "oil well drilling system" is not intended to limit the use of the equipment and processes described with those terms to drilling an oil well. The present disclosure is applicable to any software application that requires a modification or upgrade based on the performance of unit tests. The terms also encompass drilling natural gas wells or hydrocarbon wells in general. Further, such wells can be used for production, monitoring, or injection in relation to the recovery of hydrocarbons or other materials from the subsurface.

The present application is directed to object deserializer that can take a file containing relational data and convert the individual portions of data in the file into data objects in memory which can be manipulated by a software application for use in a unit test for code for a software application. The file may contain an extract from a database containing large quantities of data and relationships associated with the data. The object deserializer uses the application's own entity relationship model ("ERM") mapping file as a configuration file to extract the data and relationships.

In certain embodiments of the present disclosure, the object deserializer has the advantage of removing the dependency on the external database. The data for the unit test can be stored alongside the code being tested in a code repository. With the need for an external database removed, a variety of tests can be run simultaneously on a set of data without the possibility of an external conflict. Additionally, the tests can be performed in a self-contained environment under the exact conditions for each test as intended and required for a developer testing code for input into a software application.

A unit test for code for a software application may require the use of data to test the code prior to implementing the code in the implemented software. Such data may be stored in a data file. The data file can be of any format suitable for use in an information handling system. Typically, such data files are maintained in XML format, which happens to work well to store a large amount of data in a format that is accessible by software as known to a person of ordinary skill in the art. However, the use of XML format is not intended as a limitation of this disclosure, as the file can be of any format, such as JSON, binary, and more. For example, an export of data from a database can be made using a database programming language such as Structured Query Language (SQL), which is a special-purpose programming language for manipulating or managing data in relational database management systems. SQL is a standard of the American National Standards Institute and of the International Organization for Standardization.

The data file may contain an ordered set of elements. There may be an element for each record, or identifiable piece of data, that was extracted from the database. The data may be arranged and associated with different identifiers, known as tables. The table names may be present in each record to identify the association for that piece of data. For example, one table may be dedicated to a customer name. Any customer name would thus have a table name identifying the customer name as part of the customer name record. Each element may also have a list of attributes for the various columns that may exist for each piece of data associated for a particular element.

In accordance with another feature of the embodiment of the present inventions, an ERM mapping file may be present for the software application that identifies a listing of all of the data object types that are supported for that software application. The ERM mapping file may have been created at the time the software application was initially created or in any subsequent updates. The ERM mapping file may further be created when an update to the software application is required, or when an initial unit test is performed. The ERM mapping file is a known part of the software development to a person of ordinary skill in the art.

The various data object types in an ERM mapping file maps to a table in the data file. The ERM mapping file may contain the information pertaining to relational data, including such as foreign key definitions. A foreign key definition may be, for example, a field or a collection of fields that uniquely identifies a row of another table. The ERM mapping file is typically embedded in a dynamic linked library in RAM, ROM, or some other form of memory. The IHS may contain more than one ERM mapping file for a particular software application. For the purposes of the disclosure herein, the identification and example of a single ERM mapping file is not intended to limit the scope of the invention.

In an exemplary embodiment of the present invention, the method deserializes the data by reading an element from the data file, and finding the table name in the ERM mapping file to determine the type that matches the element. Continuing through the rest of the data, each column in the table maps to properties of that type. Reflection, a well-known tool among persons of ordinary skill in the art, is used to instantiate the object in memory and set its properties using the values in the element being read. The deserializer looks through all types defined in the ERM mapping file and searches through the types defined in all loaded object libraries to find the types that map to the tables listed in the ERM mapping file.

After all of the elements in the data file have been read by the deserializer, the deserializer again reads the data file in to identify and store the mapping and relationship between the data objects. The deserializer uses the ERM mapping file to identify the relational data to set up the various relationships associated with the elements. Once this is performed, all of the objects are loaded in memory and refer to each other in a manner that is readable by the software for use in the unit test. The layout is consistent with the way the objects are used by a typical software application that will implement the code being tested.

This prevents the need for a database to be maintained specifically for unit testing, or to maintain or restore a backup of a database for each successive unit test run.

With reference to the attached figures, certain embodiments of the present invention include a system 100 that may include a network 102 that couples together at least one wellsite 104A-104N. The wellsites 104A-104N may include an information handling system (IHS) 106A-106N that may use software applications that collect, process, store, correlate, and display various wellsite data and real time operating parameters. The IHS 106A, for example, may include software applications that model downhole formations, or monitor performances across various wellsites, or feed data from sensors, including downhole and surface sensors, to a remote location that contains additional software applications for performing activities associated with drilling operations. Network 102 may be coupled to multiple communication networks working in conjunction with multiple servers.

Such software applications require constant maintenance and upgrades. Such upgrades require unit testing of code in order to verify that no new bugs are introduced to the software being deployed into the software application. Such code must be tested thoroughly to ensure that the software application will continue to work, and thus the upgrades to such software application, in the form of unit testing, are done in a self-contained environment.

Figure 2:
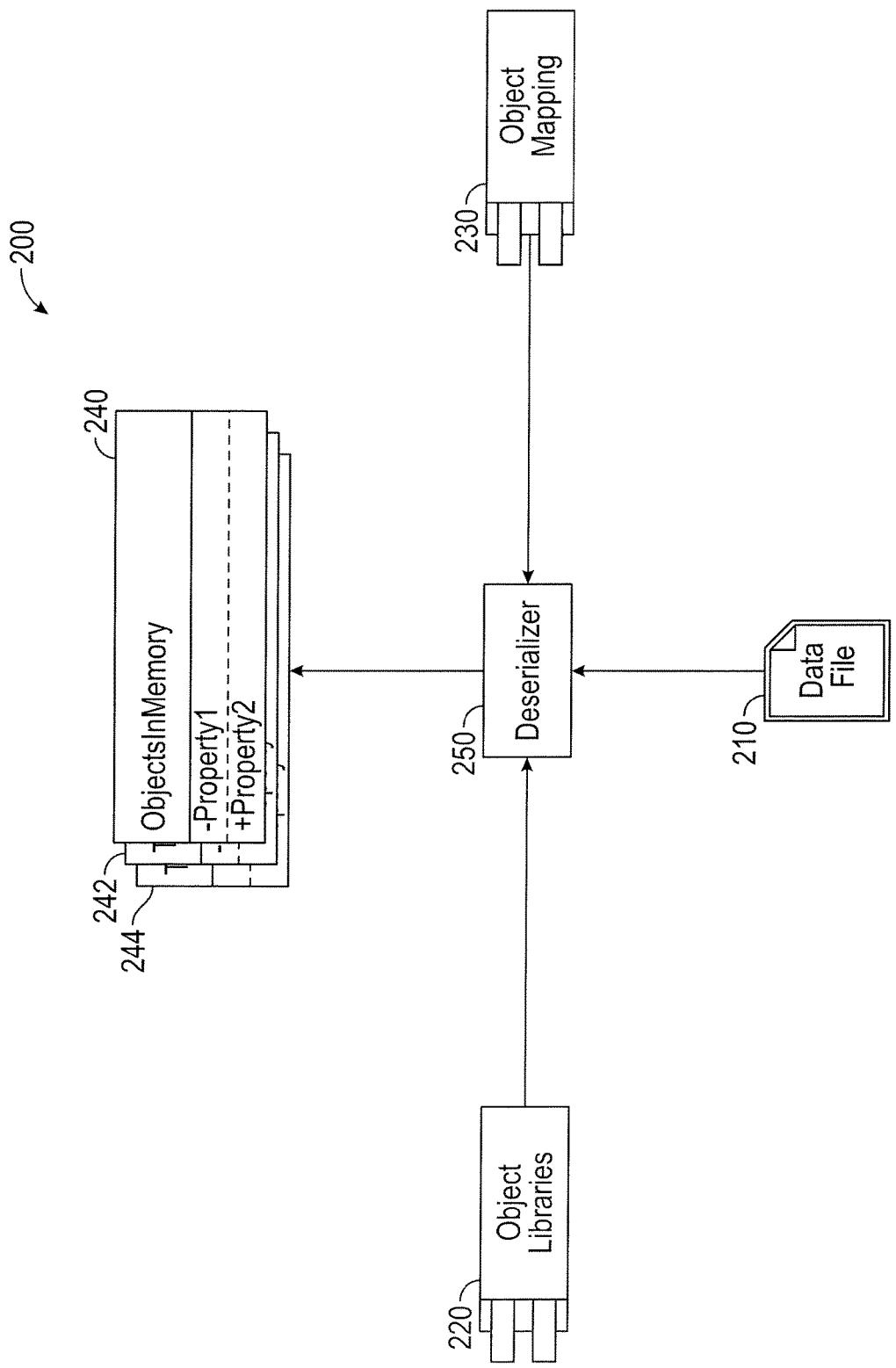
FIG. 2 shows a preferred embodiment of the deserializer in accordance with an exemplary embodiment of the present invention.

In an embodiment of the deserializer of the present invention, as shown in FIG. 2, a layout of the deserializer is presented. The deserializer 250 is implemented in software in an IHS. As shown in FIG. 2, the IHS may contain a data file 210 that receives the extracted data from a database using known means to one of ordinary skill in the art. The data file is preferably in XML format. The IHS may further contain dynamic linked libraries referred to as object libraries 220. Reflection, a known software tool, is used to find the objects in the object libraries, instantiate them in memory and set their values. For example, Reflection would find "customer" and know what dynamic link library to use and which type to instantiate when encountering the customer element from the data file. This would activate an object and return an object of that type.

The IHS may further contain an ERM mapping file as described above identified as object mapping 230 in FIG. 2. The object mapping file 230 may be used to identify the relationships associated with elements, data, objects, and table names. Once the deserializer performs the steps described above and further detailed in FIG. 4, the deserializer renders the data objects with their associated relationships in memory 240, 242, 244 for use by a software application.

Figure 3:
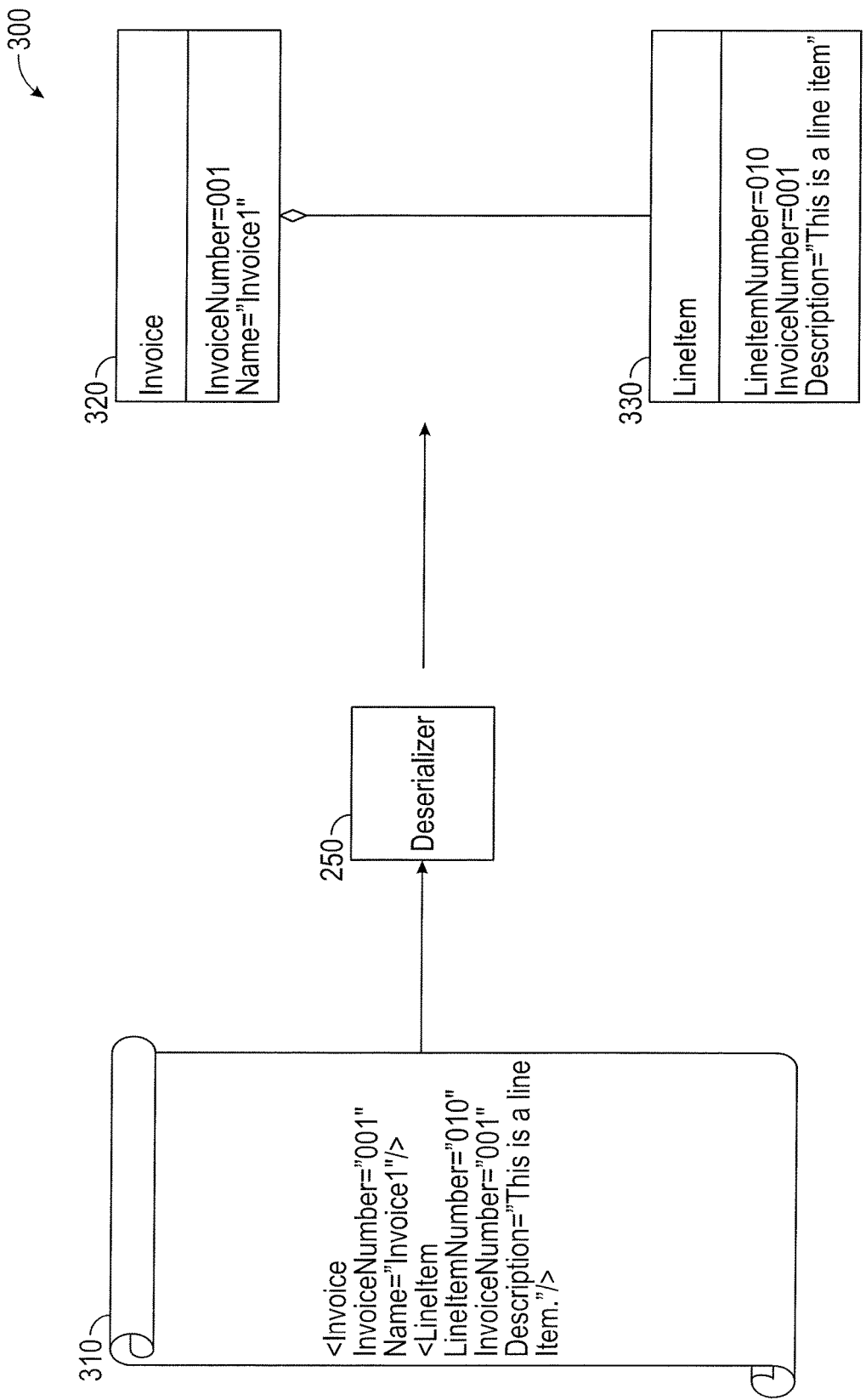
FIG. 3 shows an exemplary embodiment of an input and output data structure and relationship model in accordance with an exemplary embodiment of the present invention.

FIG. 3 shows an exemplary embodiment of an input and output data structure and relationship model 300 in accordance with an exemplary embodiment of the present invention. The deserializer 250 receives, in operation, an input containing the data from the data file 210, associated ERM mapping from the object mapping file 230 and object libraries 220, shown as representative data in 310, which is part of an XML document. The representative data 310 contains two elements, an Invoice element and a LineItem element. The Invoice element has the InvoiceNumber of "001". The InvoiceNumber is what uniquely identifies an Invoice record. The InvoiceNumber may further be referred to as a primary key. The LineItem element has a LineItemNumber attribute with the value of "010". This is the primary key for the LineItem record. It also contains an InvoiceNumber attribute with the value of "001". The InvoiceNumber field is the foreign key that refers to the row in the Invoice table. From a data perspective, this allows a person or ordinary skill in the art to known what invoice a set of line items refers to. This also refers to the Invoice element's primary key of the same name. When the deserializer passes through the XML document, it will create an Invoice object and a LineItem object in memory. Thereafter, the deserializer further inspects the data to determine if there is a relationship between Invoice 320 and LineItem 330 and will create a reference between these two objects based on the values of the Invoice Number properties on each of those objects.

The deserializer performs the steps described above and in FIG. 4 to generate data objects such as 320 and 330 that correspond to the input data 310 as output data 230 and 330.

Figure 4:
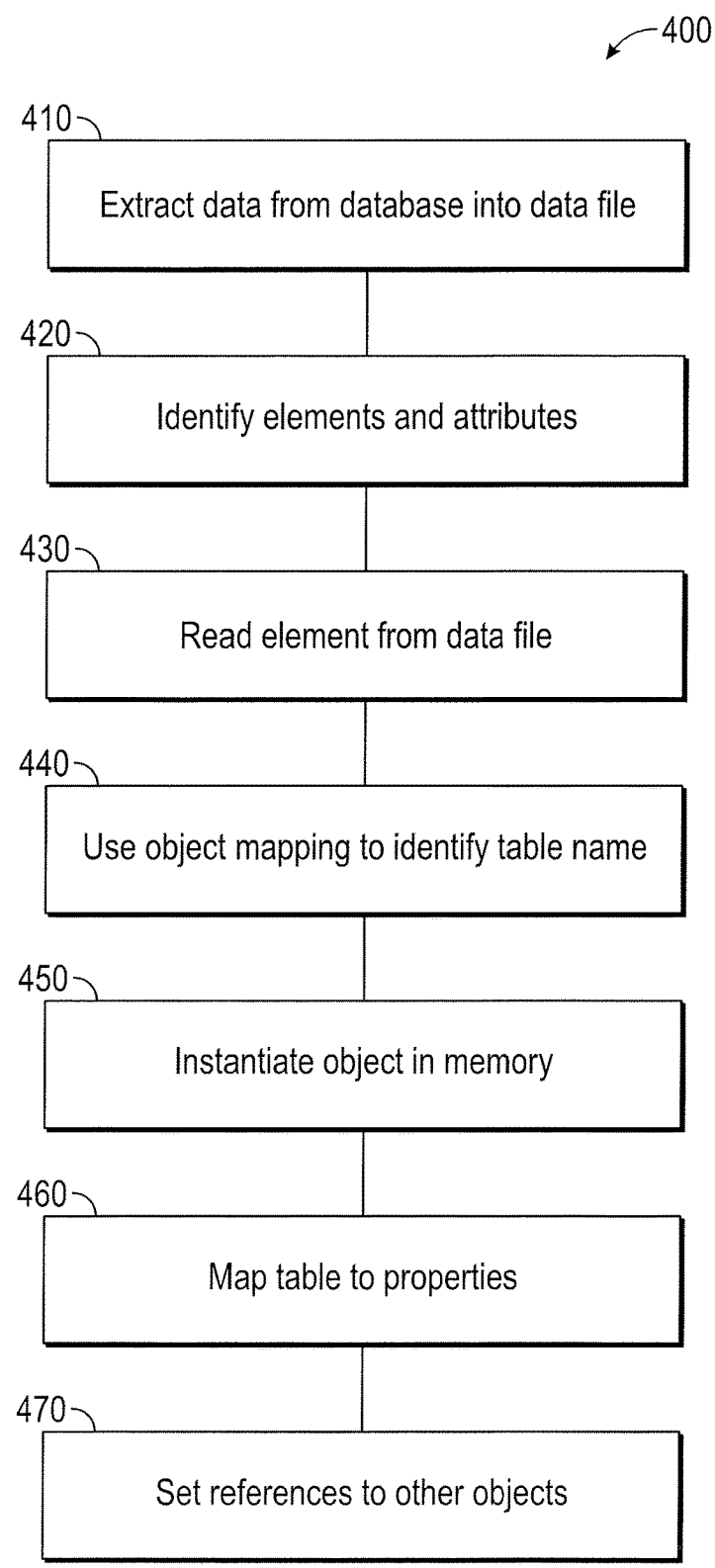
FIG. 4 is a flow chart illustrating an exemplary method of deserializing a data file in accordance with an exemplary embodiment of the present invention.

FIG. 4 is a flow chart 400 illustrating an exemplary method of deserializing a data file in accordance with an exemplary embodiment of the present invention. In 410, data is extracted in the IHS from the database for a data file during the development of the unit test, prior to the actual operation on the data. In 420, the IHS identifies the elements and attributes associated with the data to create the types of objects as shown in illustrative form at Invoice 320 and LineItem 330. In 430, the deserializer in the IHS reads elements from the data file. In 440, the object mapping file is used to identify table name and set up the relationships for the data elements. In step 450, the IHS instantiates the object in memory. In 460, the IHS continues to map table to the properties of the various data elements. In 470, the references to the objects and relational data are set as each data element is read throughout the data file.

By using the present invention, the data needed to perform complex testing for unit tests can be read from a file rather than a database. This removes the need for significant infrastructure to instantiate and set the state for an application to perform a unit test. With software applications reaching higher levels of complexity, the ability to remove infrastructure such as a database and having a constant data set ready to perform unit testing significantly improves the software development and improvement process and reduces costs.

As described above, the software application unit test being developed must have realistic data in order to meet quality testing and be ready for implementation into the software application. The data may be voluminous and complex such that having to enter the data to measure the unit test may not be possible. In prior implementations, data for tests may have been entered using various software programmer time, which may take several hundreds of hours and delay the implementation of the unit test. This may result in expensive and wasteful use of resources. Other implementations may include using a back-up database which is dedicated to the test, though this would further require the use of specialized hardware and software to set up for each run of each test. This may also limit whether and how the number of simultaneous tests can be run for unit tests in the event that multiple unit tests are occurring simultaneously to test different additional features that may be implemented in a software application.

Based on the disclosure herein, each such unit test can be self-contained and have all of the necessary data available for each test and run of the unit test. The unit test can be run without reference to an external database or network connection, or even run simultaneously with other unit tests.

The objects of the present invention will result in better implementation of code and updates to software applications and enable better quality checks for the code. This will further assure better code quality and decrease time to implement new features in software applications and increase time to market.

The description herein may be implemented with reference to a data layer in software development. This description and the objects herein may further be used for any software developer to unit test code that needs data without having a need for an external database. Because the unit tests can run in any order without the risk of creating resource conflicts, and run simultaneously every time code for a unit test is checked in as part of the development process, the disclosure herein reduces the threshold of difficulty, hassle and effort for creating unit tests.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method for performing a unit test on code for a software application dependent on an external database in a self-contained environment comprising:

extracting data from the external data base into a data file, wherein the data file contains an ordered set of elements arranged in tables;

receiving a mapping file that identifies a listing of all of the data object types that are supported by the software application and relational data, wherein the data object types map to a table in the data file;

identify the elements and attributes associated with the data;

reading each element from the data file and identifying its respective table name to determine an object type that matches the element and relationships for the data elements using the mapping file;

generating data objects reflecting the relationship for the entities, wherein the entities are linked together within the data objects;

storing the data objects in memory; and test the software application using the data objects from the memory, wherein the software application is now not dependent on the external database.

2. The method of claim 1, wherein the data file is an XML file.

3. The method of claim 1, wherein the generated data objects can be used simultaneously in multiple test environments.

4. The method of claim 1, wherein the generated data objects are stored alongside the test code.

5. The method of claim 1, wherein the relationships identify that the entities share at least an attribute.

6. The method of claim 5, further wherein the attribute may be used to link together the data objects.

7. The method of claim 1, wherein the test code concerns a software application for a rig operation.

8. A system for performing a unit test on code for a software application dependent on an external database in a self-contained environment comprising a processor and memory to perform the steps of:

extracting data from the external data base into a data file, wherein the data file contains an ordered set of elements arranged in tables;

receiving a mapping file that identifies a listing of all of the data object types that are supported by the software application and relational data, wherein the data object types map to a table in the data file;

identify the elements and attributes associated with the data;

reading each element from the data file and identifying its respective table name to determine an object type that matches the element and relationships for the data elements using the mapping file;

generating data objects reflecting the relationship for the entities, wherein the entities are linked together within the data objects;

storing the data objects in a memory; and testing the software application using the data objects from the memory, wherein the software application is now not dependent on the external database.

9. The system of claim 8, wherein the data file is an XML file.

10. The system of claim 8, wherein the generated data objects can be used simultaneously in multiple test environments.

11. The system of claim 8, wherein the generated data objects are stored alongside the code.

12. The system of claim 8, wherein the relationships identify that the entities share at least an attribute.

13. The system of claim 12, further wherein the attribute may be used to link together the data objects.

14. The system of claim 8, wherein the test code concerns a software application for a rig operation.

15. A computer-readable storage medium, the computer readable storage medium comprising a magnetic storage device having instructions stored thereon, the instructions configured to, in response to execution by one or more computing devices, cause operations including:
   performing a unit test on code for a software application dependent on an external database in a self-contained environment, the method comprising:
   extracting data from the external data base into a data file, wherein the data file contains an ordered set of elements arranged in tables;
   receiving a mapping file that identifies a listing of all of the data object types that are supported by the software application and relational data, wherein the data object types map to a table in the data file;
   identify the elements and attributes associated with the data;
   reading each element from the data file and identifying its respective table name to determine an object type that matches the element and relationships for the data elements using the mapping file;
   generating data objects reflecting the relationship for the entities, wherein the entities are linked together within the data objects;
   storing the data objects in a memory; and
   testing the software application using the data objects from the memory, wherein the software application is now not dependent on the external database.

16. The computer-readable storage medium of claim 15, wherein the data file is an XML file.

17. The computer-readable storage medium of claim 15, wherein the generated data objects can be used simultaneously in multiple test environments.

18. The computer-readable storage medium of claim 15, wherein the generated data objects are stored alongside the code.

19. The computer-readable storage medium of claim 15, wherein the relationships identify that the entities share at least an attribute.

20. The computer-readable storage medium of claim 19, further wherein the attribute may be used to link together the data objects.

* * * * *